(12) United States Patent
Kim et al.

(10) Patent No.: US 9,997,749 B2
(45) Date of Patent: Jun. 12, 2018

(54) RECHARGEABLE BATTERY

(71) Applicant: Samsung SDI Co., Ltd., Yongin-si, Gyeonggi-do (KR)

(72) Inventors: Yu-Na Kim, Yongin-si (KR); Jang-Ho Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 138 days.

(21) Appl. No.: 15/068,246

(22) Filed: Mar. 11, 2016

(65) Prior Publication Data

US 2016/0301042 A1  Oct. 13, 2016

(30) Foreign Application Priority Data

Apr. 7, 2015 (KR) ........................ 10-2015-0049233

(51) Int. Cl.
*H01M 2/06* (2006.01)
*H01M 2/30* (2006.01)

(52) U.S. Cl.
CPC ............... *H01M 2/06* (2013.01); *H01M 2/30* (2013.01)

(58) Field of Classification Search
CPC ........... H01M 2/06; H01M 2/021; H01M 2/30
See application file for complete search history.

(56) References Cited

U.S. PATENT DOCUMENTS

| | | | |
|---|---|---|---|
| 2007/0154802 A1 | 7/2007 | Uh | |
| 2008/0038627 A1* | 2/2008 | Yamauchi | H01M 2/34 429/53 |
| 2010/0233528 A1* | 9/2010 | Kim | H01M 2/043 429/178 |
| 2012/0225348 A1* | 9/2012 | Kim | H01M 2/024 429/179 |
| 2012/0282502 A1 | 11/2012 | Kim | |

(Continued)

FOREIGN PATENT DOCUMENTS

| | | |
|---|---|---|
| JP | 2013-93160 A | 5/2013 |
| KR | 10-0709873 | 4/2007 |

(Continued)

OTHER PUBLICATIONS

KIPO Notice of Allowance dated Mar. 28, 2017, for corresponding Korean Patent Application No. 10-2015-0049233 (5 pages).

(Continued)

*Primary Examiner* — Matthew J Merkling
(74) *Attorney, Agent, or Firm* — Lewis Roca Rothgerber Christie LLP (57) ABSTRACT

A rechargeable battery includes: an electrode assembly comprising: a first electrode and a second electrode; a case comprising an opening at a side of the case, the case accommodating the electrode assembly; a cap assembly comprising a cap plate covering the opening of the case, a first terminal protruding out of the cap plate and electrically coupled to a first electrode, and a second terminal protruding out of the cap plate and electrically coupled to a second electrode; a first current collector coupled to a lower part of the cap assembly and having a first side electrically connected to the first terminal and a second side coupled to the first electrode; and a deformation preventer coupled to the lower part of the cap assembly and formed to accommodate a part of the first current collector.

6 Claims, 5 Drawing Sheets

(56) References Cited

U.S. PATENT DOCUMENTS

2013/0149598 A1    6/2013   Kim et al.
2013/0266830 A1* 10/2013   Byun ...................... H01M 2/34
                                                             429/61

FOREIGN PATENT DOCUMENTS

KR    10-2012-0124026     11/2012
KR    10-2013-0065574      6/2013

OTHER PUBLICATIONS

KIPO Office Action dated Sep. 5, 2016, for corresponding Korean Patent Application No. 10-2015-0049233 (6 pages).

* cited by examiner

RECHARGEABLE BATTERY

CROSS-REFERENCE TO RELATED APPLICATION

This application claims priority to and the benefit of Korean Patent Application No. 10-2015-0049233 filed in the Korean Intellectual Property Office on Apr. 7, 2015, the entire content of which is incorporated herein by reference.

BACKGROUND

1. Field

Aspects of embodiments of the present invention relate to a rechargeable battery.

2. Description of the Related Art

A rechargeable battery differs from a primary battery in that it can be repeatedly charged and discharged, while the latter may be incapable of being recharged. A low-capacity rechargeable battery is used in small portable electronic devices such as mobile phones, notebook computers, and camcorders, while a high-capacity rechargeable battery is widely used as a power source for driving a motor of a hybrid vehicle.

A rechargeable battery generally includes, for example, a case for accommodating an electrode assembly, and a cap assembly for closing and sealing the case. In order to assemble such a rechargeable battery, an uncoated region formed at one side of the electrode assembly may be connected to a current collecting member combined to the cap assembly.

On the other hand, the current collecting member is generally combined to the cap assembly by a caulking method. However, when a caulked part is weak, the current collecting member may be twisted. Such twist may cause an increase in contact resistance and thus generate heat, making it difficult to improve high power output performance.

The above information disclosed in this Background section is only for enhancement of understanding of the background of the invention and therefore it may contain information that does not constitute prior art.

SUMMARY

Aspects of embodiments of the present invention relate to a rechargeable battery, and a reusable rechargeable battery.

According to aspects of embodiments of the present invention, a rechargeable battery may prevent or reduce instances of deformation of a current collecting member.

According to some example embodiments, a rechargeable battery includes: an electrode assembly comprising: a first electrode and a second electrode; a case comprising an opening at a side of the case, the case accommodating the electrode assembly; a cap assembly comprising a cap plate covering the opening of the case, a first terminal protruding out of the cap plate and electrically coupled to a first electrode, and a second terminal protruding out of the cap plate and electrically coupled to a second electrode; a first current collector coupled to a lower part of the cap assembly and having a first side electrically connected to the first terminal and a second side coupled to the first electrode; and a deformation preventer coupled to the lower part of the cap assembly and formed to accommodate a part of the first current collector.

The cap assembly may include a mounting groove recessed with a size corresponding to the deformation preventer, the deformation preventer may include a body in the mounting groove, and the deformation preventer may further include a fixing groove recessed to accommodate the part of the first current collector at a lateral side of the body.

A lower part of the body of the deformation preventer may be in the mounting groove, and the fixing groove may be at an upper part of the body that is not in the mounting groove.

A width of the fixing groove may be equal to a width of an end portion of the first current collector.

A fixing protrusion may penetrate the first current collector and may be at a location of the cap assembly to which the first current collector is coupled, the deformation preventer may further include an extension extending toward the fixing protrusion from the body, and the extension may include a through-hole penetrated by the fixing protrusion.

The extension may have a plate shape and a size corresponding to a lower lateral surface of the first current collector.

The rechargeable battery may further include a second current collector coupled to the lower part of the cap assembly and may include a first side electrically connected to the second terminal and a second side coupled to the second electrode.

The rechargeable battery according to some example embodiments of the present invention includes the deformation preventing member. Accordingly, even though the first current collecting member may be loosely combined to the cap assembly, instances of the first current collecting member being deformed may be prevented or reduced by the deformation preventing member.

Generally, when contact resistance between components increases in the rechargeable battery, high heat may be generated, which may deteriorate performance of the rechargeable battery. However, in the rechargeable battery according to some example embodiments of the present invention, instances of the first current collecting member being twisted may be prevented or reduce, thereby preventing or reducing instances of contact resistance between the first current collecting member and the cap assembly from being increased, thereby manufacturing a high power rechargeable battery.

DETAILED DESCRIPTION

Aspects of embodiments of the present invention will be described more fully hereinafter with reference to the accompanying drawings, in which example embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Further, in example embodiments, for components having the same configuration, like reference numerals are used and described only in a representative embodiment, and in other example embodiments, only different configurations from the representative embodiment will be described.

Throughout this specification and the claims that follow, when it is described that an element is "coupled" to another element, the element may be "directly coupled" to the other element or indirectly coupled to the other element through a third element. Further, unless explicitly described to the contrary, the word "comprise" and variations such as "comprises" or "comprising" will be understood to imply the inclusion of stated elements but not the exclusion of any other elements.

Figure 1:
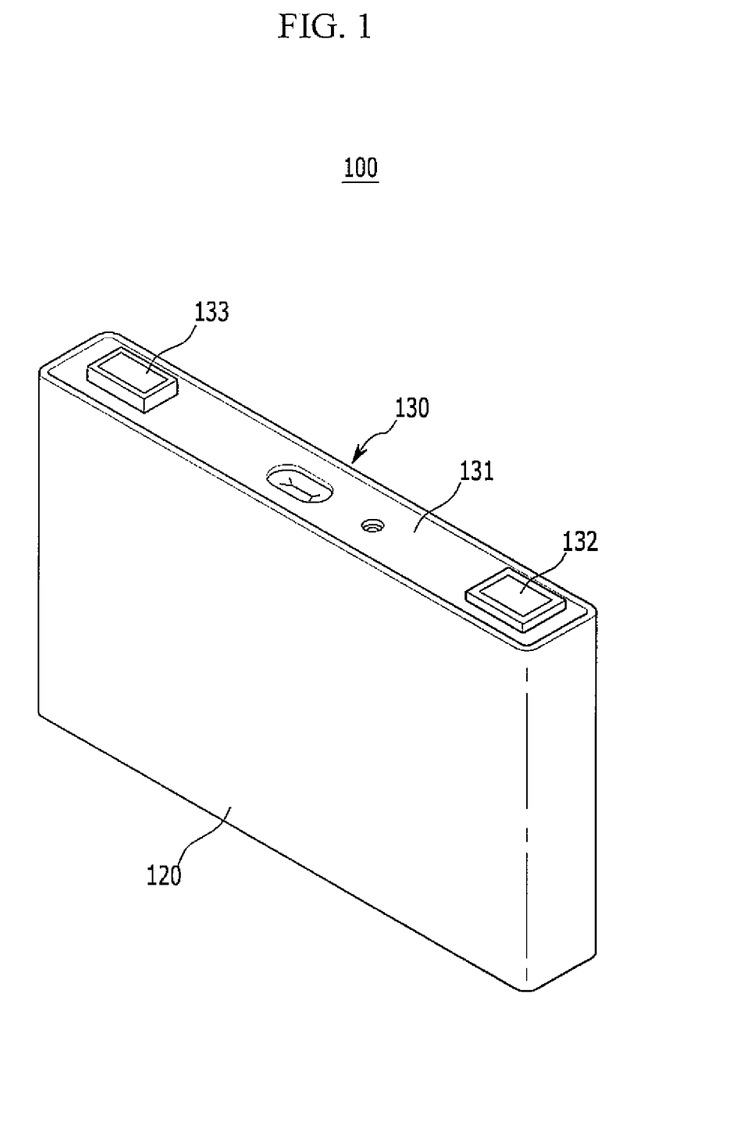
FIG. 1 is a perspective view of a rechargeable battery according to an example embodiment of the present invention.
Figure 2:
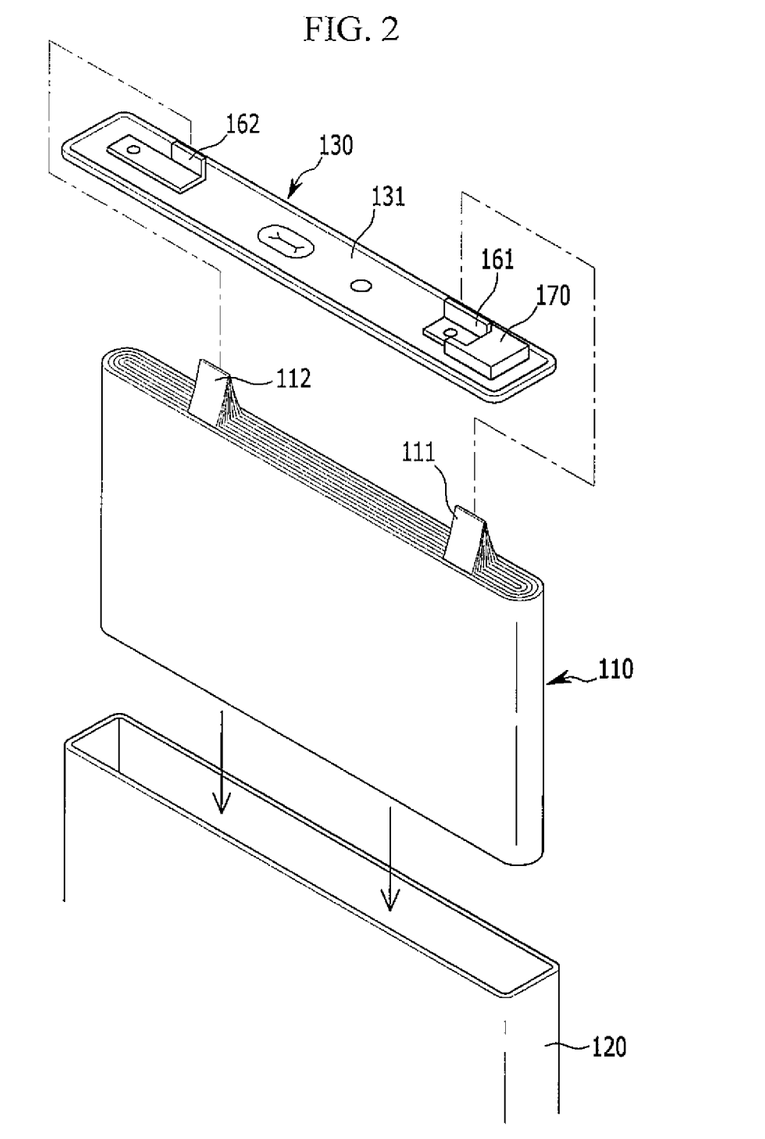
FIG. 2 is an exploded perspective view of the rechargeable battery according to the example embodiment of the present invention illustrated in FIG. 1.
Figure 3:
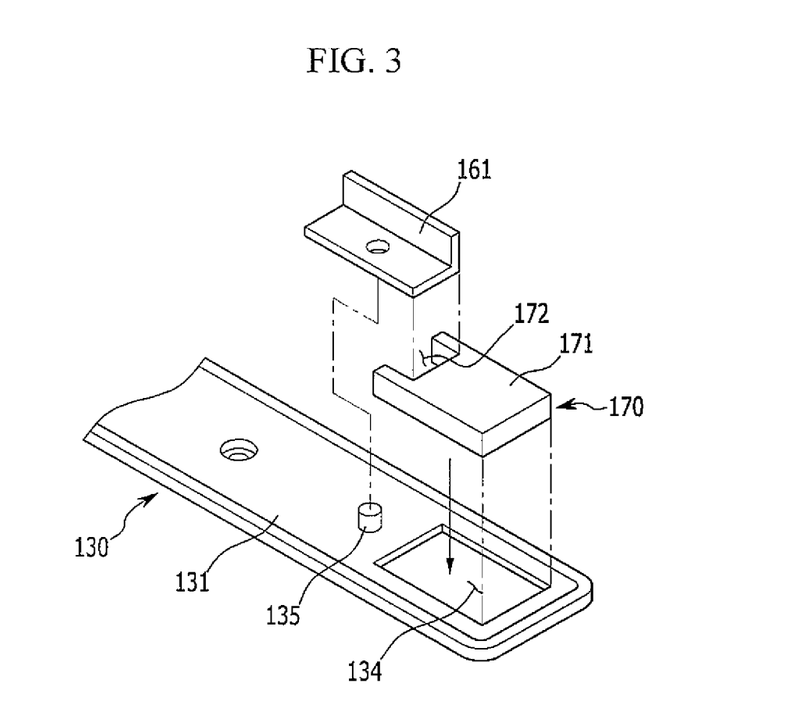
FIG. 3 is an exploded perspective view showing only a deformation preventing member and a first current collecting member from FIG. 2.

FIG. 1 is a perspective view of a rechargeable battery according to an example embodiment of the present invention, FIG. 2 is an exploded perspective view of the rechargeable battery according to the example embodiment of the present invention illustrated in FIG. 1, and FIG. 3 is an exploded perspective view showing only a deformation preventing member and a first current collecting member (or first current collector) from FIG. 2. For ease of description, in FIG. 2, a cap assembly 130 is illustrated such that it is turned upside down.

Referring to FIGS. 1 to 3, the rechargeable battery 100 according to the example embodiment of the present invention includes an electrode assembly 110, a case 120, the cap assembly 130, a first current collecting member (or first current collector) 161, and a deformation preventing member (or deformation preventer) 170.

The rechargeable battery 100 according to some example embodiments will be described such that it has a prismatic shape as a lithium ion rechargeable battery. However, the present invention is not limited thereto, and the present invention may be applicable to various types of batteries such as a lithium polymer battery, a cylindrical battery, etc.

The electrode assembly 110 includes a first electrode 111 and a second electrode 112. A separator may be interposed between the first electrode 111 and the second electrode 112. Herein, the first electrode 111 may be a positive electrode, while the second electrode 112 may be a negative electrode. However, the first electrode 111 is not limited to being the positive electrode and the second electrode 112 is not limited to being the negative electrode, so they can be changed according to a design.

One side of the case 120 is opened (e.g., the case 120 has an opened side or an opening at a side of the case 120). The case 120 accommodates (or encloses) the electrode assembly 110. For this purpose, the case 120 may have, for example, a cuboid shape.

According to some embodiments, an opening is formed at a top surface of the case 120, and the opening may be large enough to receive or accommodate the electrode assembly 110. That is, the opening may be larger than a cross-sectional area of the electrode assembly 110 to enable the electrode assembly to be inserted through the opening 110. The case 120 may be, for example, made of a metal such as aluminum, stainless steel, etc.

The cap assembly 130 includes a cap plate 131, a first terminal 132, and a second terminal 133.

The cap plate 131 covers the opened part of the case 120. The cap plate 131 may have, for example, a plate shape that extends in one direction, but it is not limited thereto.

The first terminal 132 protrudes outside of the cap plate 131, and is electrically coupled to the first electrode 111. The first terminal 132 may have, for example, a rectangular plate shape.

The second terminal 133 protrudes outside of the cap plate 131, and is electrically coupled to the second electrode 112. The second terminal 133 may have, for example, a rectangular plate shape.

The first current collecting member 161 is combined (or coupled) to a lower part of the cap assembly 130, and has one side electrically coupled to the first terminal 132 and the other side combined (or coupled) to the first electrode 111. The first terminal 132 may be electrically coupled to the cap assembly 131. Accordingly, the cap assembly 131 may be charged to have the same polarity as the first electrode 111. For example, when the first electrode 111 is a positive electrode, the cap assembly 131 may be positively charged.

The rechargeable battery 100 according to some example embodiments of the present invention may include a second current collecting member 162. The second current collecting member 162 is combined to the lower part of the cap assembly 130, and has one side electrically coupled to the second terminal 133 and the other side combined to the second electrode 112. The second terminal 133 may be charged to have the same polarity as the second electrode 112 by the second current collecting member 162. For example, when the second electrode 112 is a negative electrode, the second terminal 133 may be positively charged.

On the other hand, the first terminal 132 described above may be electrically coupled to the first electrode 111 via the first current collecting member 161. In addition, the second terminal 133 is electrically coupled to the second electrode 112 via the second current collecting member 162. However, the present invention is not limited thereto, and the first terminal 132 may be electrically coupled to the second electrode 112 and the second terminal 133 may be electrically coupled to the first electrode 111.

The deformation preventing member 170 is formed such that it is combined to the lower part of the cap assembly 130 and to accommodate a part of the first current collecting member 161. The deformation preventing member 170 is formed such that it to support the part of the first current collecting member 161 and to prevent deformation of the first current collecting member 161.

A structure in which the deformation preventing member 170 and the cap assembly 130 are combined to prevent the deformation of the first current collecting member 161 will now be described in more detail.

In the rechargeable battery 100 according to some example embodiments of the present invention, a mounting groove 134 may be formed in the cap assembly 130. The mounting groove 134 is recessed with a size corresponding to the deformation preventing member 170 such that it partially overlaps the first current collecting member 161.

In addition, the deformation preventing member 170 may include a body 171. The body 171 is accommodated in the mounting groove 134. A shape of the body 171 may be identical to that of the mounting groove 134. For example, the body 171 may have a hexahedral shape. In this case, the mounting groove 134 may also have a hexahedral shape.

A fixing groove 172 may be formed at a lateral side of the body 171. The fixing groove 172 is recessed to accommodate one end portion of the first current collecting member 161. For this purpose, the fixing groove 172 may be formed such that it has the same width (e.g., approximately the same width) as the end portion of the first current collecting member 161.

The structure of the body 171 and the fixing groove 172 will be described in more detail. A lower part of the body 171 may be partially accommodated in the mounting groove 134. In addition, the fixing groove 172 may be formed in an upper part of the body 171 that is not accommodated in the mounting groove 134.

For example, based on an imaginary horizontal line for separating the body 171 into upper and lower halves, a lower part may be accommodated in the mounting groove 134, and an upper part may be formed with the fixing groove 172. However, it is not limited thereto, and the fixing groove 172 may be formed across the upper and lower parts of the body 171.

Hereinafter, in the rechargeable battery 100 according to some example embodiments of the present invention, an example variation of the deformation preventing member will be described.

Figure 4:
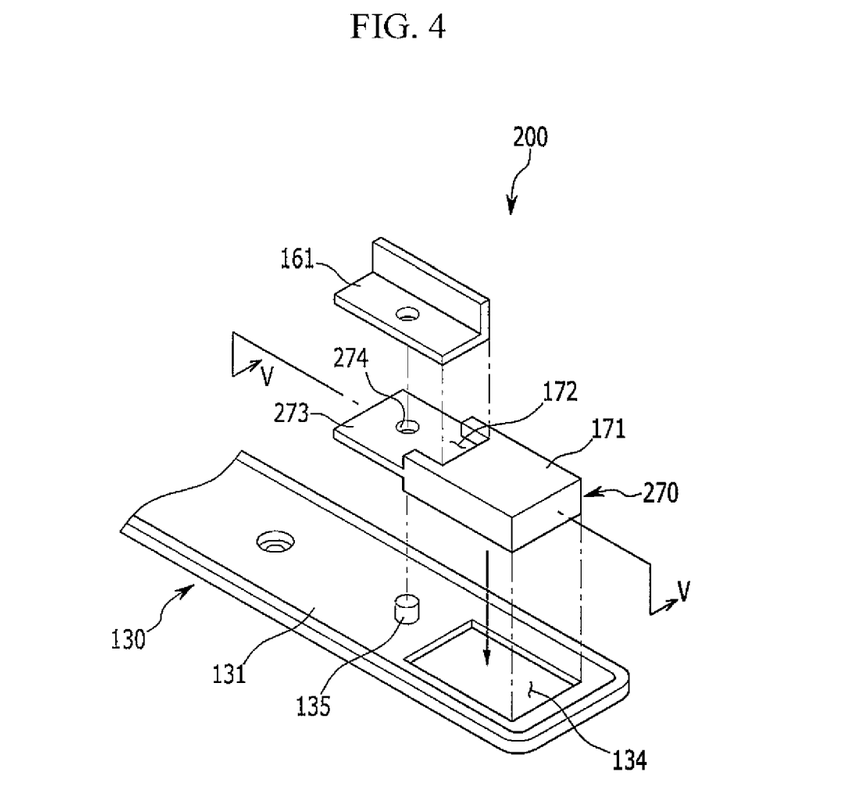
FIG. 4 is an exploded perspective view showing only a cap assembly and a deformation preventing member from a rechargeable battery according to another exemplary embodiment.
Figure 5:
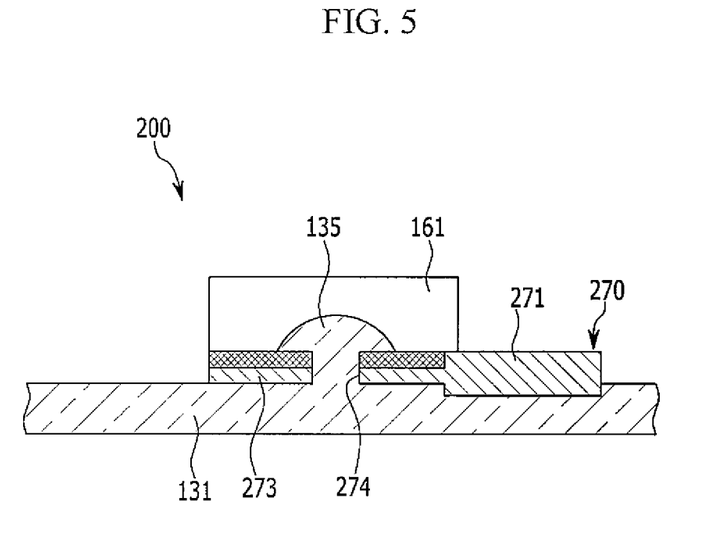
FIG. 5 is a cross-sectional view of the cap assembly assembled taken along the line V-V of FIG. 4.

FIG. 4 is a perspective view of a rechargeable battery according to another example embodiment, and FIG. 5 is a cross-sectional view of the rechargeable battery illustrated in FIG. 4 to which the cap assembly is assembled, taken along the like V-V of FIG. 4.

A rechargeable battery 200 according to the current example embodiment will now be described with reference to FIGS. 4 and 5. In a portion of a cap assembly 130 to which a first current collecting member 161 is combined, a fixing protrusion 135 penetrating the first current collecting member 161 may be formed. The fixing protrusion 135 may have, for example, a cylindrical shape.

In addition, the deformation preventing member 270 may further include an extension 273. The extension 273 is extended toward the fixing protrusion 135 from one lateral side of a body 171. The extension 273 may have, for example, a plate shape having a size corresponding to a lower lateral surface of a first current collecting member 161.

In this case, a through-hole 274 penetrated by the fixing protrusion 135 may be formed in the extension 273. The fixing protrusion 135 may form the through-hole 274 of the extension 273, and may be combined to the first current collecting member 161.

For example, in order to combine the fixing protrusion 135 and the first current collecting member 161 in a rivet structure, an end portion of the fixing protrusion 135 may be processed by using a separate tool, but it is not limited thereto.

The structure described above, compared to the deformation preventing member 170 described above (referring to FIG. 3), may have an improved coupling force since a contact area between the first current collecting member 161 and the deformation preventing member 270 increases by the extension 273. Accordingly, instances of deformation of the first current collecting member 161 can be more reliably prevented or reduced.

The rechargeable battery 100 according to the example embodiment of the present invention having the structure as described above includes the deformation preventing member 170. Accordingly, even though the first current collecting member 161 is loosely coupled to the cap assembly 130, instances of deformation of the first current collecting member 161 can be prevented or reduced by the deformation preventing member 170.

Generally, when contact resistance between components increases in the rechargeable battery, high heat may be generated to deteriorate performance of the rechargeable battery. However, in the rechargeable battery 100 according to the example embodiment of the present invention, because instances of the first current collecting member 161 being twisted may be prevented or reduce, such that the contact resistance between the first current collecting member 161 and the cap assembly 130 may not increase, the high power rechargeable battery 100 can be manufactured.

While this invention has been described in connection with what is presently considered to be practical example embodiments, the drawings and the detailed description of the present invention which are described above are merely illustrative, are just used for the purpose of describing the present invention, and are not used for qualifying the meaning or limiting the scope of the present invention, which is disclosed in the appended claims. Therefore, it will be understood by those skilled in the art that various modifications and other equivalent example embodiments may be made from the present invention. Accordingly, an actual technical protection scope of the present invention is to be defined by the claims, and their equivalents.

| Description of Some of the Symbols | | | |
|---|---|---|---|
| 100: | rechargeable battery | 110: | electrode assembly |
| 111: | first electrode | 112: | second electrode |
| 120: | case | 130: | cap assembly |
| 131: | cap plate | 132: | first terminal |
| 133: | second terminal | 134: | mounting groove |
| 135: | fixing protrusion | 161: | first current collecting member |
| 162: | second current collecting member | | |
| 170, 270: | deformation preventing member | | |
| 171: | body | 172: | fixing groove |
| 273: | extension | 274: | through-hole |

What is claimed is:
1. A rechargeable battery comprising:
an electrode assembly comprising:
　a first electrode and a second electrode;
　a case comprising an opening at a side of the case, the case accommodating the electrode assembly;
　a cap assembly comprising a cap plate covering the opening of the case, a first terminal protruding out of the cap plate and electrically coupled to a first electrode, and a second terminal protruding out of the cap plate and electrically coupled to a second electrode;
　a first current collector coupled to a lower part of the cap assembly and having a first side electrically connected to the first terminal and a second side coupled to the first electrode;
　a fixing protrusion extending from the cap plate into the first current collector; and
　a deformation preventer coupled to the lower part of the cap assembly and formed to accommodate a part of the first current collector,
wherein the cap assembly comprises a mounting groove recessed with a size corresponding to the deformation preventer,
the deformation preventer comprises a body in the mounting groove, and the deformation preventer further comprises a fixing groove recessed to accommodate the part of the first current collector at a lateral side of the body.

2. The rechargeable battery of claim 1, wherein a lower part of the body of the deformation preventer is in the mounting groove, and the fixing groove is at an upper part of the body that is not in the mounting groove.

3. The rechargeable battery of claim 1, wherein a width of the fixing groove is equal to a width of an end portion of the first current collector.

4. The rechargeable battery of claim 1, wherein the fixing protrusion penetrating the first current collector is at a location of the cap assembly to which the first current collector is coupled, the deformation preventer further comprises an extension extending toward the fixing protrusion from the body, and the extension comprises a through-hole penetrated by the fixing protrusion.

5. The rechargeable battery of claim 4, wherein the extension has a plate shape and a size corresponding to a lower lateral surface of the first current collector.

6. The rechargeable battery of claim 1, further comprising a second current collector coupled to the lower part of the cap assembly and comprising a first side electrically connected to the second terminal and a second side coupled to the second electrode.

* * * * *